(12) United States Patent
Kimura

(10) Patent No.: US 7,648,000 B2
(45) Date of Patent: Jan. 19, 2010

(54) CONTROL SYSTEM AND MOTORCYCLE WITH THE SAME

(75) Inventor: Tetsuya Kimura, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 455 days.

(21) Appl. No.: 11/555,332

(22) Filed: Nov. 1, 2006

(65) Prior Publication Data
US 2007/0102217 A1 May 10, 2007

(30) Foreign Application Priority Data
Nov. 1, 2005 (JP) ............................. 2005-318200

(51) Int. Cl.
*B62K 11/00* (2006.01)
*B60K 28/10* (2006.01)
(52) U.S. Cl. ...................................... 180/219; 180/282
(58) Field of Classification Search ................ 180/219, 180/282, 283; 280/279, 280
See application file for complete search history.

(56) References Cited

U.S. PATENT DOCUMENTS

| 4,572,317 | A | * | 2/1986 | Isono et al. | 180/227 |
| 4,624,470 | A | * | 11/1986 | Love | 280/279 |
| 4,917,209 | A | * | 4/1990 | Horiike et al. | 180/219 |
| 5,014,807 | A | * | 5/1991 | Horiike et al. | 180/219 |
| 5,361,864 | A | * | 11/1994 | Tanaka | 180/219 |
| 7,059,619 | B2 | * | 6/2006 | Dom | 280/276 |
| 7,322,589 | B2 | * | 1/2008 | Kesselgruber et al. | 280/124.106 |
| 7,497,294 | B2 | * | 3/2009 | Tsujii et al. | 180/219 |

FOREIGN PATENT DOCUMENTS

| EP | 1 273 506 A1 | 1/2003 |
| JP | 61-160374 | 7/1986 |
| JP | 64-78993 A | 3/1989 |
| JP | 05-246370 A | 9/1993 |
| JP | 7-98507 | 10/1995 |
| JP | 2829009 | 11/1998 |

(Continued)

OTHER PUBLICATIONS

Official Communication issued in corresponding European Patent Application No. 06022863.2, mailed on Aug. 13, 2009.

*Primary Examiner*—Lesley Morris
*Assistant Examiner*—Marc A Scharich
(74) *Attorney, Agent, or Firm*—Keating & Bennett, LLP

(57) ABSTRACT

A control system includes a vehicle speed sensor, a roll rate sensor, a steering angle calculation unit, a steering angle control unit, an actuator, and a rear wheel steering angle sensor. The steering angle calculation unit acquires a roll rate and vehicle speed of a motorcycle and determines a target steering angle and a delayed steering angle of a rear wheel depending on the acquired roll rate and vehicle speed. The steering angle control unit causes the actuator to steer the rear wheel by the actuator based on the delayed steering angle determined by the steering angle calculation unit. Alternatively, a motorcycle includes a first holding member arranged to rotatably and steerably hold a front wheel of the motorcycle, a second holding member that is attached to the first holding member arranged to hold a rear wheel, and a controller arranged to swing one of the first and second holding members with respect to the other based on the roll rate detected by the roll rate detector.

8 Claims, 14 Drawing Sheets

FOREIGN PATENT DOCUMENTS

| | | |
|---|---|---|
| JP | 2927477 | 7/1999 |
| JP | 2938911 | 8/1999 |
| JP | 3206610 | 9/2001 |
| JP | 2002-087363 | 3/2002 |
| JP | 2004-338507 | 12/2004 |
| JP | 2006-44528 | 2/2006 |
| JP | 2006-182091 | 7/2006 |
| JP | 3200771 | 8/2006 |

* cited by examiner

CONTROL SYSTEM AND MOTORCYCLE WITH THE SAME

BACKGROUND OF THE INVENTION

1. Field of the Invention

The present invention relates to a control system of a motorcycle and a motorcycle including such a control system.

2. Description of the Related Art

Conventionally, front-and-rear-wheel steering systems have been developed that steer the rear wheel according to the steering of the front wheel of a motorcycle.

Some conventional front-and-rear-wheel steering systems have a mechanism that steers the rear wheel mechanically or electrically according to the steering angle of the front wheel (for example, see JP 61-160374 A, JP 2927477 B, and JP 3206610 B), and other systems have a mechanism that steer the rear wheel automatically according to a lateral force exerted on the rear wheel (for example, see JP 2829009 B and JP 7-98507 B).

However, when any one of the mechanisms disclosed in JP 61-160374 A, JP 2927477 B, JP 3206610 B, JP 2829009 B, and JP 7-98507 B is used, the stability of the motorcycle at the time of straight running is improved while the stability of the motorcycle at the time of turning is decreased.

In the front-and-rear-wheel steering system described in JP 2938911 B, for example, the steering amount of the rear wheel is changed between the high speed running and the low and middle speed running. This is intended to give the desired stability during straight running and stability during steering at high speed running and during the low and middle speed running, respectively. In addition, in the front-and-rear-wheel steering system described in JP 3200771 B, a speed, a yaw rate, a roll rate and the like are detected and the rear wheel is steered in phase with the steering direction of the front wheel based on the detection results. Thus, the vibration of the motorcycle during steering the rear wheel is damped.

Additionally, in the systems described in JP 2938911 B and JP 3200771 B, the steering angle of the rear wheel is determined based on that of the front wheel. In such a steering method, a large steering torque and a large roll angle are needed to turn the motorcycle in an unstable condition. For this reason, the drivability of the motorcycle decreases and stable turning cannot be performed in some cases.

SUMMARY OF THE INVENTION

In order to overcome the problems described above, preferred embodiments of the present invention provide a control system of a motorcycle that is capable of improving running stability and preventing turning performance from being degraded, and a motorcycle including such a novel control system.

A control system according to a first preferred embodiment of the present invention that controls the balance of a motorcycle includes a holding member arranged to rotatably and steerably hold a front wheel of the motor cycle, a rear wheel supporting mechanism connected to the holding member and arranged to rotatably and swingably support a rear wheel of the motor cycle, a roll rate detector arranged to detect a roll rate of the motorcycle, a swinging device arranged to swing the rear wheel, and a controller arranged to cause the swinging device to swing the rear wheel based on the roll rate detected by the roll rate detector.

In the control system, the rear wheel supporting mechanism rotatably and swingably holds the rear wheel. The controller causes the swinging device to swing the rear wheel based on the roll rate of the motorcycle detected by the roll rate detector.

In such a way, the rear wheel is swung based on the roll rate of the motorcycle, thereby making it possible to adjust the ratio of a lateral force of the front wheel to a lateral force of the rear wheel so as to reduce the roll rate of the motorcycle. This improves the running stability of the motorcycle and prevents the turning performance from being degraded.

The rear wheel supporting mechanism may support the rear wheel tiltably with respect to an axis that is substantially parallel to the up-and-down direction of the holding member, and the controller may tilt the rear wheel with respect to the axis that is substantially parallel to the up-and-down direction of the holding member based on the roll rate detected by the roll rate detector.

In this case, the controller tilts the rear wheel with respect to the axis parallel to the up-and-down direction of the holding member based on the roll rate of the motorcycle detected by the roll rate detector. Thus, the ratio of the lateral force of the front wheel to the lateral force of the rear wheel can be adjusted so that the roll rate of the motorcycle can be reduced. As a result, the running stability of the motorcycle can be improved and the turning performance can be prevented from being degraded.

The rear wheel supporting mechanism may support the rear wheel tiltably with respect to an axis that is substantially parallel to the back-and-forth direction of the holding member, and the controller may tilt the rear wheel with respect to the axis that is substantially parallel to the back-and-forth direction of the holding member based on the roll rate detected by the roll rate detector.

In this case, the controller tilts the rear wheel with respect to the axis parallel to the back-and-forth direction of the holding member based on the roll rate of the motorcycle detected by the roll rate detector. Thus, the ratio of the lateral force of the front wheel to the lateral force of the rear wheel can be adjusted so that the roll rate of the motorcycle can be reduced. As a result, the running stability of the motorcycle can be improved and the turning performance can be prevented from being degraded.

The control system may further include a speed detector that detects the vehicle speed of the motorcycle, the controller may determine a lean angle of the rear wheel based on the product of the roll rate detected by the roll rate detector and a factor, and the factor may be determined based on the vehicle speed detected by the speed detector.

In this case, the lean angle of the rear wheel can be determined depending on the roll rate and the vehicle speed of the motorcycle. Thus, the roll rate of the motorcycle can be reliably reduced. As a result, the running stability of the motorcycle can be reliably improved and the turning performance can be reliably prevented from being degraded.

The controller may tilt the rear wheel at a response speed determined based on the vehicle speed detected by the speed detector.

In this case, since the rear wheel is tilted at the response speed depending on the vehicle speed, the instability phenomenon unique to the motorcycle can be reliably prevented. Thus, the running stability of the motorcycle can be reliably improved and the turning performance can be reliably prevented from being degraded.

The controller may tilt the rear wheel with a first-order delay filter and a time constant of the first-order delay filter may be determined based on the vehicle speed detected by the speed detector.

In this case, since the rear wheel is tilted with the first-order delay filter of the time constant depending on the vehicle speed of the motorcycle, the instability phenomenon unique to the motorcycle can be more reliably prevented. Thus, the running stability of the motorcycle can be more reliably improved and the turning performance can be more reliably prevented from being degraded.

A motorcycle according to another preferred embodiment of the present invention includes a control system arranged to control the balance of a motorcycle, a driving device arranged to generate a driving force to rotate a rear wheel of the motorcycle and a driving force transmission mechanism arranged to transmit the driving force generated by the driving device to the rear wheel, and the control system includes a holding member arranged to rotatably and steerably hold a front wheel, a rear wheel supporting mechanism connected to the holding member and arranged to rotatably and swingably support the rear wheel, a roll rate detector arranged to detect a roll rate of the motorcycle, a swinging device arranged to swing the rear wheel, and a controller arranged to cause the swinging device to swing the rear wheel based on the roll rate detected by the roll rate detector.

In the motorcycle, the driving force generated by the driving device is transmitted to the rear wheel by the driving force transmission mechanism and the rear wheel is driven. In addition, the balance of the motorcycle is controlled by the control system.

In this case, since the ratio of a lateral force of the front wheel to a lateral force of the rear wheel is adjusted by the control system, the roll rate of the motorcycle can be reduced. Thus, the running stability of the motorcycle can be improved and the turning performance can be prevented from being degraded.

A control system according to still another preferred embodiment of the present invention that controls the balance of a motorcycle includes a first holding member arranged to rotatably and steerably hold a front wheel of the motorcycle, a second holding member that is attached to the first holding member arranged to swingably hold a rear wheel, a roll rate detector arranged to detect a roll rate of the motorcycle, a swinging device arranged to swing one of the first and second holding members with respect to the other, and a controller arranged to cause the swinging device to swing one of the first and second holding members with respect to the other based on the roll rate detected by the roll rate detector.

In the control system, the first holding member holding the front wheel and the second holding member holding the rear wheel are swingably attached to each other. The controller swings one of the first and second holding members with respect to the other based on the roll rate of the motorcycle detected by the roll rate detector.

In such away, one of the first and second holding members is swung with respect to the other based on the roll rate of the motorcycle, thereby making it possible to adjust the ratio of a lateral force of the front wheel to a lateral force of the rear wheel so as to reduce the roll rate of the motorcycle. Thus, the running stability of the motorcycle can be improved and the turning performance can be prevented from being degraded.

The first and second holding members may be attached to each other rotatably about an axis that extends in the back-and-forth direction, an extension line of the axis that extends in the back-and-forth direction may pass substantially through a contact point between the rear wheel and the ground, and the controller may relatively rotate one of the first and second holding members with respect to the other based on the roll rate detected by the roll rate detector.

In this case, the controller relatively rotates one of the first and second holding members with respect to the other about the axis that extends in the back-and-forth direction based on the roll rate of the motorcycle detected by the roll rate detector. Thus, the ratio of the lateral force of the front wheel to the lateral force of the rear wheel can be adjusted so that the roll rate of the motorcycle can be reduced. As a result, the running stability of the motorcycle can be improved and the turning performance can be prevented from being degraded.

Furthermore, the first and second holding members are attached to each other so that the extension line of the axis that extends in the above-mentioned back-and-forth direction passes substantially through the contact point between the rear wheel and the ground. For this reason, when the second holding member is rotated with respect to the first holding member, the rear wheel rotates about the vicinity of the contact point with the ground. Thus, the rear wheel can be prevented from slipping on the ground and safety can be improved.

The control system may further include a speed detector that detects a vehicle speed of the motorcycle and the controller may determine a relative rotation angle of the second holding member with respect to the first holding member based on the product of the roll rate detected by the roll rate detector and a factor, the factor being determined based on the vehicle speed detected by the speed detector.

In this case, the relative rotation angle of the second holding member with respect to the first holding member may be determined depending on the roll rate and the vehicle speed of the motorcycle. Thus, the roll rate of the motorcycle can be reliably reduced. As a result, the running stability of the motorcycle can be reliably improved and the turning performance can be reliably prevented from being degraded.

The controller may relatively rotate one of the first and second holding members with respect to the other at a response speed determined based on the vehicle speed detected by the speed detector.

In this case, since one of the first and second holding members is relatively rotated with respect to the other at the response speed depending on the vehicle speed, the instability phenomenon unique to the motorcycle can be reliably prevented. Thus, the running stability of the motorcycle can be reliably improved and the turning performance can be reliably prevented from being degraded.

The controller may relatively rotate one of the first and second holding members with respect to the other with a first-order delay filter and a time constant of the first-order delay filter may be determined based on the vehicle speed detected by the speed detector.

In this case, since one of the first and second holding members is relatively rotated with respect to the other with the first-order delay filter of the time constant depending on the vehicle speed of the motorcycle, the instability phenomenon unique to the motorcycle can be more reliably prevented. Thus, the running stability of the motorcycle can be more reliably improved and the turning performance can be more reliably prevented from being degraded.

A motorcycle according to still another preferred embodiment of the present invention includes a control system arranged to control the balance of a motorcycle, a driving device arranged to generate a driving force to rotate a rear wheel of the motorcycle and a driving force transmission mechanism arranged to transmit the driving force generated by the driving device to the rear wheel, and the control system includes a first holding member arranged to rotatably and steerably hold a front wheel of the motorcycle, a second holding member that is attached to the first holding member arranged to swingably hold a rear wheel, a roll rate detector arranged to detect a roll rate of the motorcycle, a swinging device arranged to swing one of the first and second holding members with respect to the other, and a controller arranged to cause the swinging device to swing one of the first and second holding members with respect to the other based on the roll rate detected by the roll rate detector.

In the motorcycle, the driving force generated by the driving device is transmitted to the rear wheel by the driving force transmission mechanism and the rear wheel is driven. In addition, the balance of the motorcycle is controlled by the control system.

In this case, since the ratio of a lateral force of the front wheel to a lateral force of the rear wheel is adjusted by the control system, the roll rate of the motorcycle can be reduced.

Thus, the running stability of the motorcycle can be improved and the turning performance can be prevented from being degraded.

Other features, elements, characteristics, and advantages of the present invention will become more apparent from the following description of preferred embodiments of the present invention with reference to the attached drawings.

DETAILED DESCRIPTION OF PREFERRED EMBODIMENTS

Hereinafter, a control system according to preferred embodiments of the present invention and a motorcycle including the same will be described with reference to drawings.

First Preferred Embodiment

Figure 1:
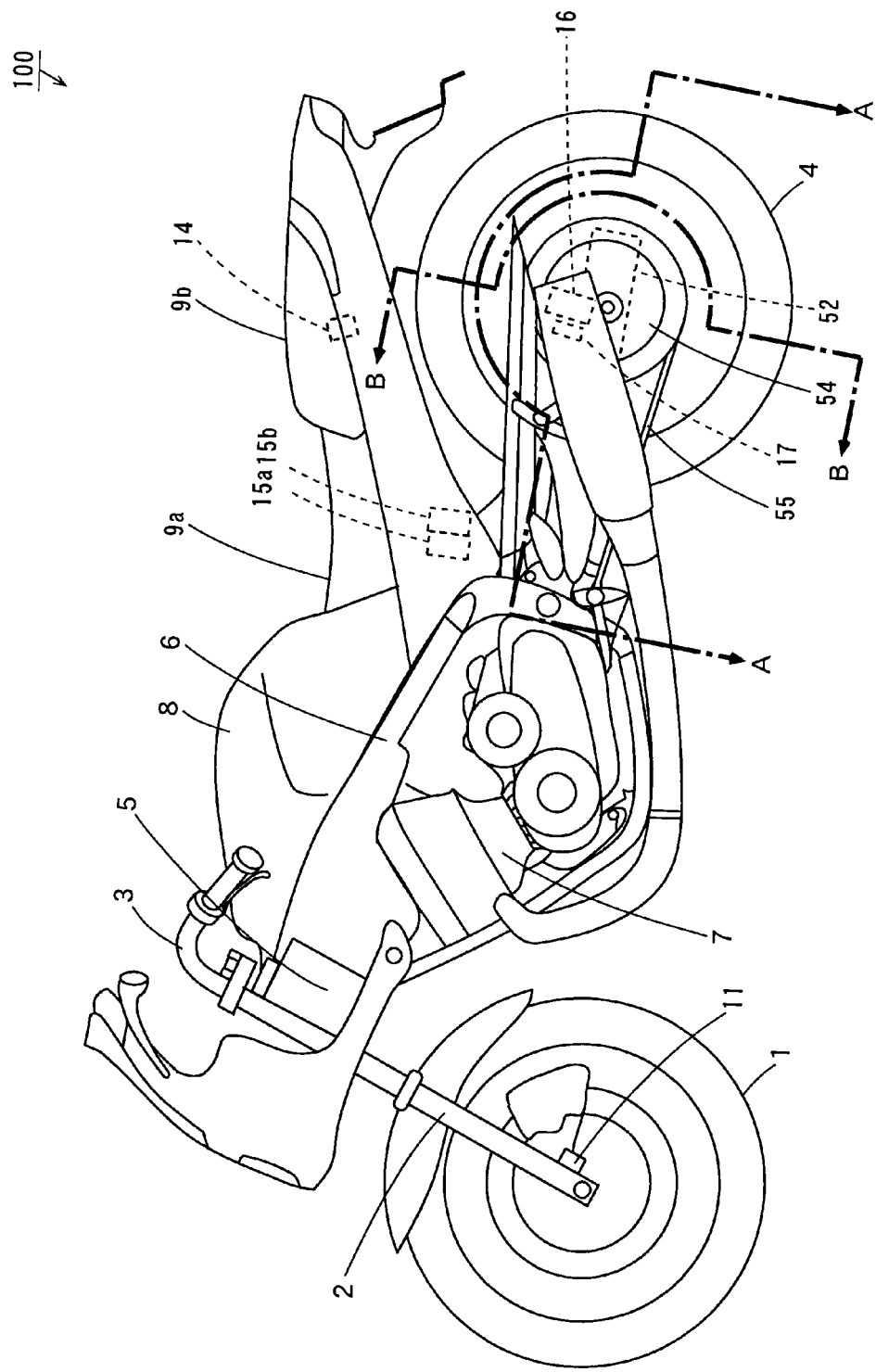
FIG. 1 is an external side view of a motorcycle according to a first preferred embodiment of the present invention.

FIG. 1 is an external side view of a motorcycle according to a first preferred embodiment of the present invention.

In a motorcycle 100, a front wheel 1 is rotatably held by a front fork 2. The front fork 2 is attached to a head pipe 5 so as to be turnable to the right and left. A handle 3 is attached to the upper end of the front fork 2.

A rider operates the handle 3, so that the front fork 2 turns to the right and left of the motorcycle 100. Thus, the front wheel 1 is steered.

A main body frame 6 is connected to the rear side of the head pipe 5. An engine 7 is held in the center of the main body frame 6. A fuel tank 8 is provided above the engine 7, and a front seat 9a and a rear seat 9b are provided behind the fuel tank 8.

A rear arm 52 (see FIGS. 2 and 3) is connected to the main body frame 6 so as to extend behind the engine 7. The rear arm 52 rotatably holds a rear wheel 4 and a chain sprocket 54.

A vehicle speed sensor 11 is provided in the vicinity of the lower end of the front fork 2. In addition, a roll rate sensor 14 is provided under the rear seat 9b.

A rear wheel steering angle sensor 17 is provided in the rear arm 52 on the side of the rear wheel 4. In addition, a steering angle calculation unit 15a and a steering angle control unit 15b are provided below the front seat 9a, and an actuator 16 is provided on the rear arm 52 near the rear wheel 4. The vehicle speed sensor 11, the roll rate sensor 14, the steering angle calculation unit 15a, the steering angle control unit 15b, the actuator 16, and the rear wheel steering angle sensor 17 will be described in detail below.

Figure 2:
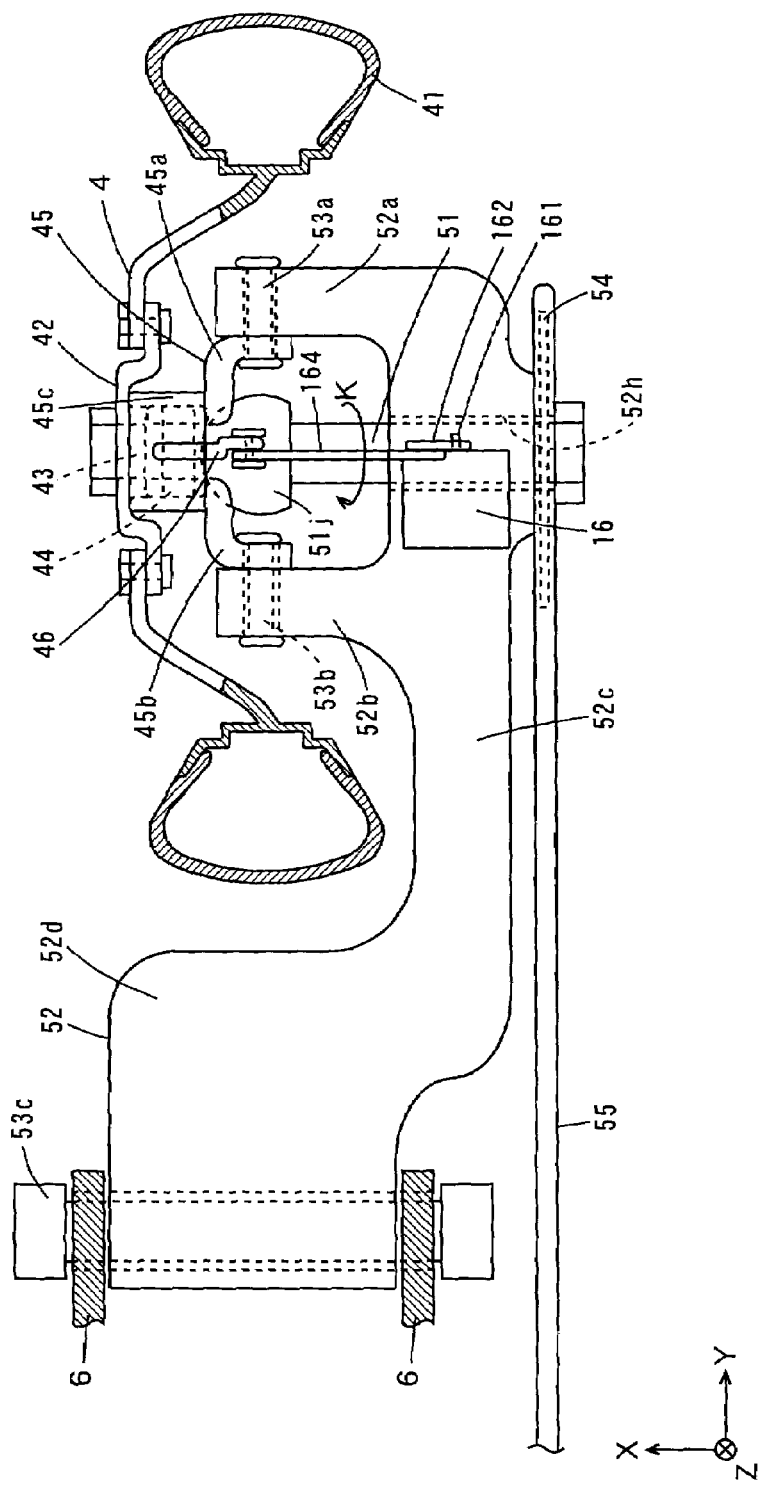
FIG. 2 is a sectional view taken along the arrowed line A-A in the motorcycle in FIG. 1.
Figure 3:
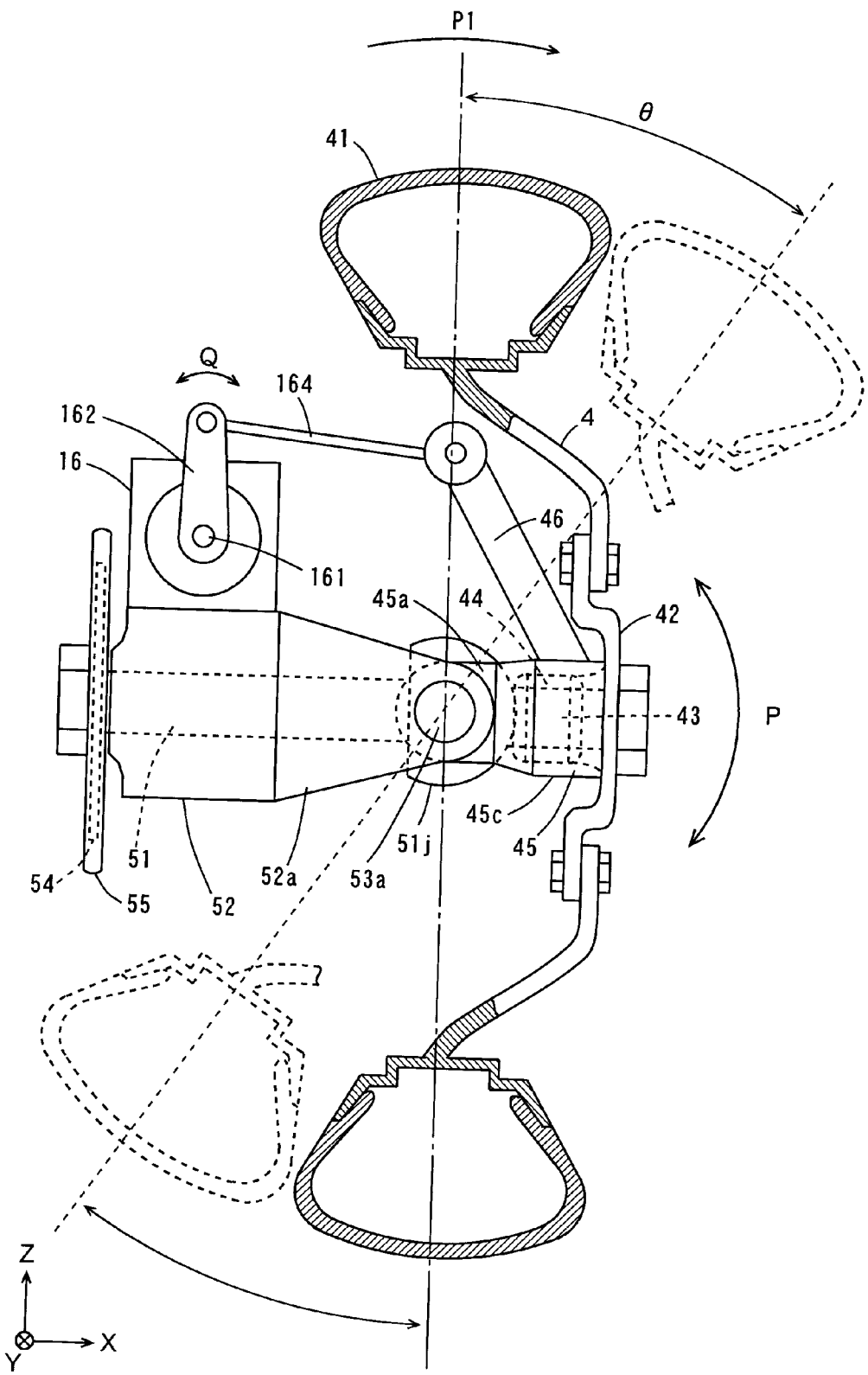
FIG. 3 is a sectional view taken along the arrowed line B-B in the motorcycle in FIG. 1.

FIG. 2 is a sectional view taken along the arrowed line A-A in the motorcycle 100 in FIG. 1, and FIG. 3 is a sectional view taken along the arrowed line B-B in the motorcycle 100 in FIG. 1. In FIGS. 2 and 3, as indicated by the arrows, the side-to-side direction of the motorcycle 100 is defined as the X direction and the back-and-forth direction of the motorcycle 100 is defined as the Y direction, and the vertical direction of the motorcycle 100 is defined as the Z direction.

As shown in FIG. 2, one end of the rear arm 52 that extends in the Y direction is connected to the main body frame 6 with a rotary connection shaft 53c. This enables the rear arm 52 to swing up and down.

The rear arm 52 has a wide portion 52d formed in the X direction near a portion connected to the main body frame 6. A narrow portion 52c narrower than the wide portion 52d is arranged so as to extend in the Y direction from one side of the wide portion 52d in the X direction.

Supporters 52a, 52b extend substantially parallel to each other in the X direction from the center of the narrow portion 52c and the end thereof.

A drive shaft holding hole 52h that extends in the X direction is formed in the narrow portion 52c between the supporters 52a and 52b. A drive shaft 51 is inserted into the drive shaft holding hole 52h. Thus, the drive shaft 51 is rotatably held by the rear arm 52. One end of the drive shaft 51 is coupled to a constant velocity universal joint 51j.

Although the constant velocity universal joint 51j is shown in a simplified manner in FIGS. 2 and 3, the constant velocity universal joint 51j is composed of an inner race that holds one end of the drive shaft 51, an outer race that arranged so as to cover the inner race, a plurality of balls attached between the inner race and the outer race, a boot and the like.

The constant velocity universal joint 51j is positioned between the supporters 52a and 52b and connected to the rear wheel rotary shaft 43, described below. The chain sprocket 54 is connected to the other end of the drive shaft 51. A chain 55 is put on the chain sprocket 54.

Coupling members 45a and 45b in an axle shaft supporting member 45 are attached in the vicinity of each of the edges of the supporters 52a, 52b with the rotary connection shafts 53a, 53b, respectively. This enables the axle shaft supporting member 45 to swing with respect to the supporters 52a, 52b of the rear arm 52 about the rotary connection shafts 53a, 53b as indicated by the arrow P in FIG. 3.

The coupling portions 45a, 45b of the axle shaft supporting member 45 are formed in an L-shape in the X-Y plane, respectively, and provided so as to be opposite to each other. In addition, a cylindrical portion 45c that extends in the X direction from the coupling portions 45a, 45b is formed in the axle shaft supporting member 45.

The rear wheel rotary shaft 43 is rotatably held inside the cylindrical portion 45c with a bearing 44 provided there between. One end of the rear wheel rotary shaft 43 is connected to the constant velocity universal joint 51j. In addition, the other end of the rear wheel rotary shaft 43 is connected to a rear wheel hub 42. The one end of the rear wheel rotary shaft 43 may be integral with the outer race of the constant velocity universal joint 51j.

The rear wheel hub 42 is substantially circular (not shown) in the Z-Y plane. The rear wheel 4 is connected to the rear wheel hub 42. A tire 41 is mounted on the periphery of the rear wheel 4.

The driving force of the engine 7 in FIG. 1 is transmitted through the chain 55 to the chain sprocket 54, and causes the chain sprocket 54 to rotate. The drive shaft 51 rotates with the chain sprocket 54 as indicated by the arrow K in FIG. 2. Thus, the rear wheel rotary shaft 43 is rotated, so that the rear wheel hub 42 and the rear wheel 4 are rotated.

In this preferred embodiment, the drive shaft 51 and the rear wheel rotary shaft 43 are connected to each other by the constant velocity universal joint 51j, thereby transmitting the turning force of the drive shaft 51 to the rear wheel rotary shaft 43 even if the axial center of the drive shaft 51 is misaligned with that of the rear wheel rotary shaft 43.

The actuator 16 is provided on the narrow portion 52c of the rear arm 52. In addition, a knuckle arm 46 is preferably integral with and formed above the cylindrical portion 45c of the axle shaft supporting member 45, which extends so as to tilt with respect to the Z direction.

The actuator 16 includes, for example, a servo motor. In this example, as indicated in FIGS. 2 and 3, a rotary shaft 161 of the servo motor sticks out so as to extend from substantially the center of the actuator 16 in the Y direction.

One end of a swing arm 162 is coupled to the rotary shaft 161. One end of a tie-rod 164 is swingably coupled to the other end of the swing arm 162. The other end of the tie-rod 164 is swingably coupled to the upper end of the knuckle arm 46.

The actuator 16 operates to rotate the rotary shaft 161. This causes the other end of the swing arm 162 to swing about the rotary shaft 161 in the directions indicated by the arrow Q. Thus, the upper end of the knuckle arm 46 is moved in the X direction by the tie-rod 164. As a result, as mentioned above, the axle shaft supporting member 45 swings about the rotary connection shafts 53a, 53b as indicated by the arrow P.

In such a way, the operation of the actuator 16 makes the rear wheel 4 tilt with respect to the Z direction in the X-Z plane. In the following description, the lean angle of the rear wheel 4 with respect to the Z direction is referred to as a rear wheel steering angle $\theta 1$. The actuator 16 is controlled by the steering angle control unit 15b.

The inventors discovered through a variety of experiments and the like that reducing the roll rate of the motorcycle can prevent the instability phenomenon unique to the motorcycle including sway during low speed running, unpleasant vibrations during the high speed running, behavior of the motorcycle caused by external influences such as wind and irregularity of the ground, and the like. In addition, the inventors focused attention on the fact that the frequency of the above-mentioned instability phenomenon and a damping factor thereof are determined depending on the speed of the motorcycle.

Consequently, in this preferred embodiment, the proportionality constant is determined according to the speed of the motorcycle 100, and then the target steering angle of the rear wheel 4 is determined by multiplying the roll rate of the motorcycle 100 by the proportionality constant. The ratio of the lateral force of the front wheel 1 to that of the rear wheel 4 is adjusted by steering the rear wheel 4 so that the rear wheel 4 is tilted at this target steering angle. Thus, the roll rate of the motorcycle 100 is reduced. As a result, the above-mentioned instability phenomenon can be prevented. The proportionality constant is determined so that the ratio of the lateral force of the front wheel 1 to that of the rear wheel 4 is the most appropriate value to reduce the roll rate of the motorcycle 100.

Furthermore, taking into consideration the above-mentioned frequency of the instability phenomenon and the damping factor thereof, the response speed is determined based on the speed of the motorcycle 100 and the rear wheel 4 is steered when the motorcycle 100 reaches the response speed so that the rear wheel 4 is tilted at the target steering angle. This makes it possible to more reliably prevent the above-mentioned instability phenomenon. Details will be described below.

Hereinafter, a control system of the motorcycle 100 according to this preferred embodiment and a control method thereof will be described.

Figure 4:
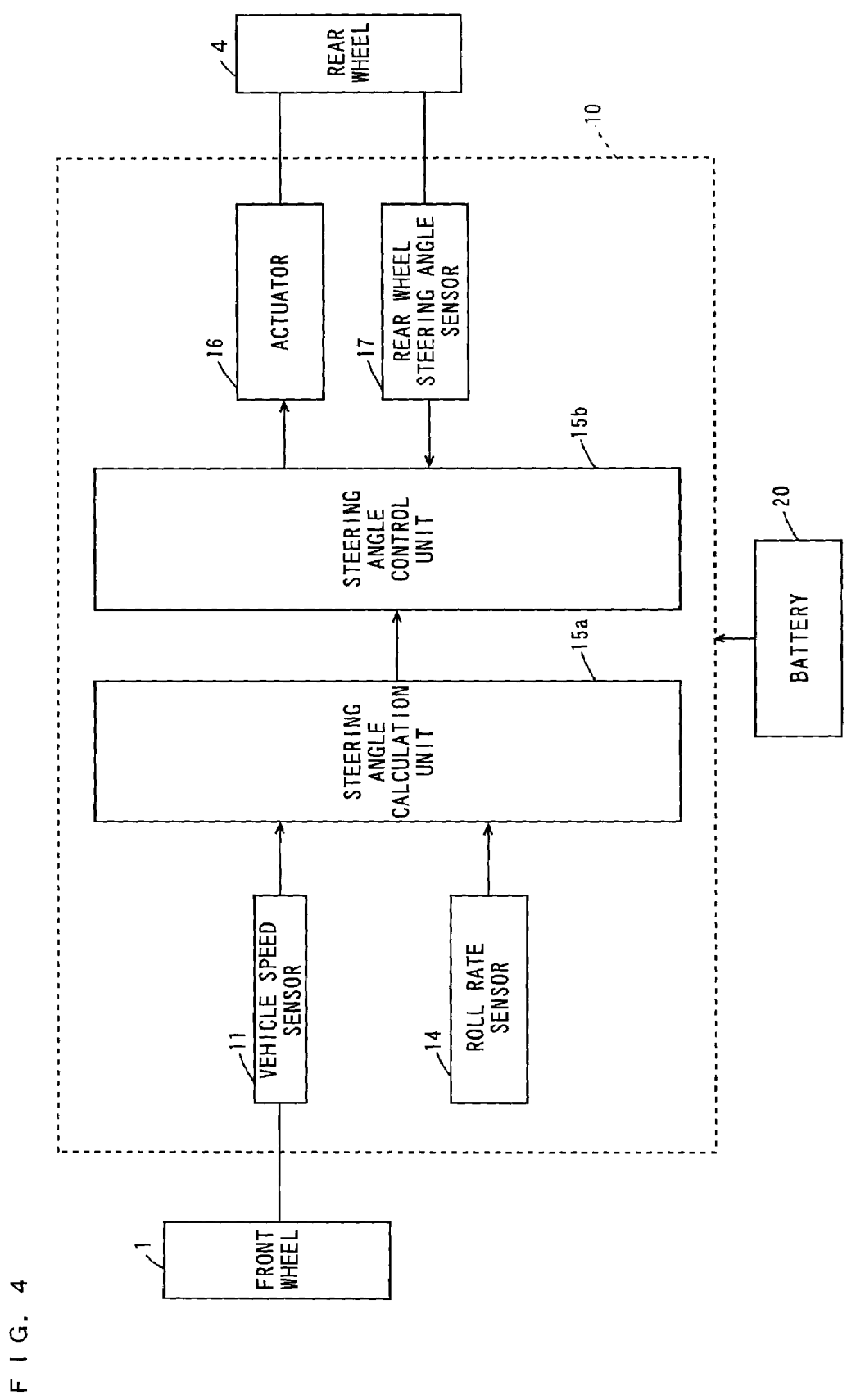
FIG. 4 is a block diagram showing one example of a control system of the motorcycle according to the first preferred embodiment of the present invention.

FIG. 4 is a block diagram showing one example of a control system 10 of the motorcycle 100 according to this preferred embodiment.

As shown in FIG. 4, the control system 10 of the motorcycle 100 includes the vehicle speed sensor 11, the roll rate sensor 14, the steering angle calculation unit 15a, the steering angle control unit 15b, the actuator 16, and the rear wheel steering angle sensor 17.

Here, electric power is supplied from a battery 20 to the control system 10. The vehicle speed sensor 11 detects the speed of the motorcycle 100 based on the number of revolutions of the front wheel 1. The roll rate sensor 14 detects the roll rate of the motorcycle 100, that is, the angular velocity of the motorcycle 100 around the axis that extends in the back-and-forth direction. The rear wheel steering angle sensor 17 detects the rear wheel steering angle $\theta 1$.

The steering angle calculation unit 15a and the steering angle control unit 15b preferably include, for example, a CPU (Central Processing Unit) and a storage device or a microcomputer. The detected values of the vehicle speed sensor 11 and the roll rate sensor 14 are input to the steering angle calculation unit 15a. The steering angle calculation unit 15a calculates the target steering angle of the rear wheel 4 based on the input detected values. The steering angle control unit 15b controls the operation of the actuator 16 based on the target steering angle calculated by the steering angle calculation unit 15a.

The steering angle control unit 15b controls the operation of the actuator 16 to adjust the rear wheel steering angle $\theta 1$ of the rear wheel 4. The adjusted rear wheel steering angle $\theta 1$ is detected by the rear wheel steering angle sensor 17 and the detected rear wheel steering angle $\theta 1$ is input to the steering angle control unit 15b. In this way, feedback control is performed on the actuator 16 based on the rear wheel steering angle $\theta 1$.

Figure 5:
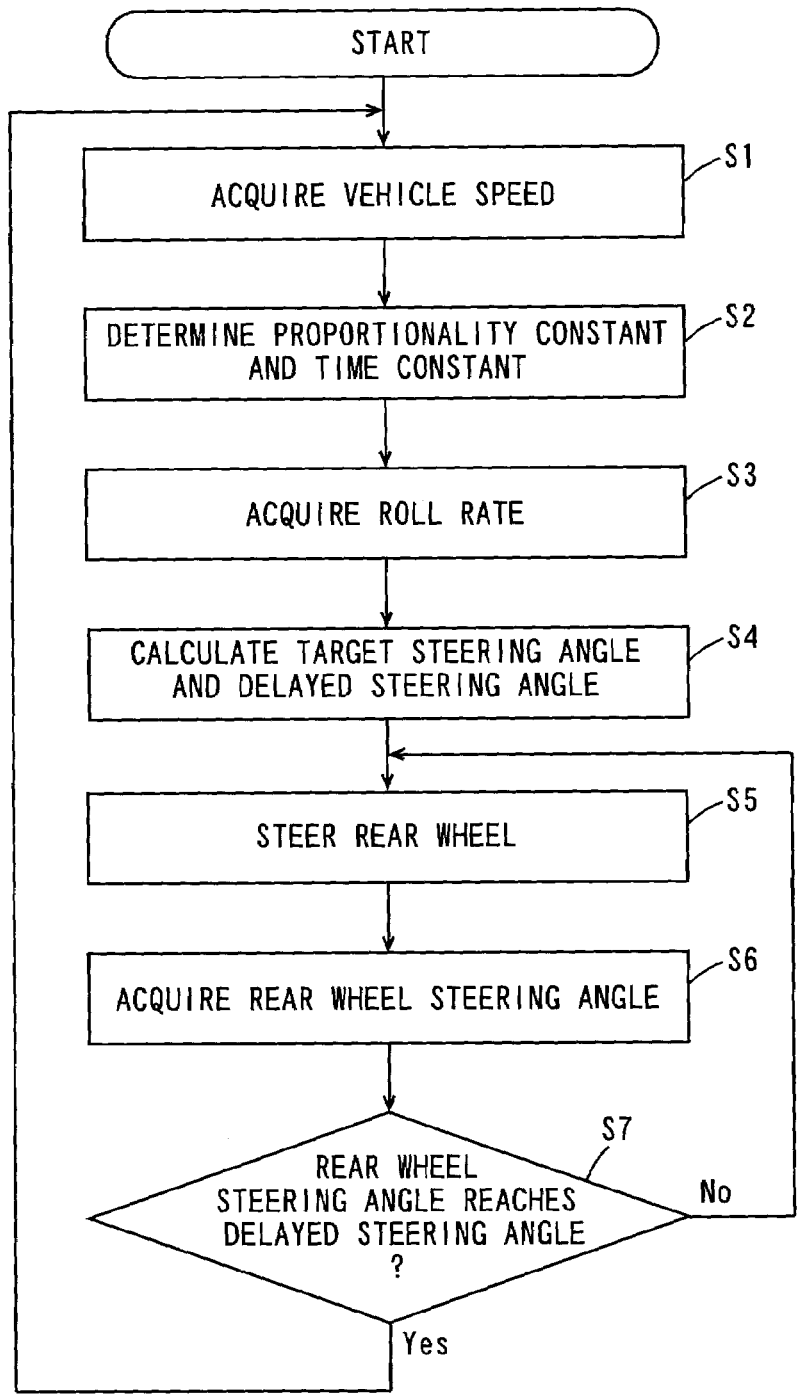
FIG. 5 is a flowchart showing one example of a control method by the control system of the motorcycle according to the first preferred embodiment of the present invention.

FIG. 5 is a flowchart showing one example of a control method by the control system 10 of the motorcycle 100 according to this preferred embodiment.

As shown in FIG. 5, the steering angle calculation unit 15a of the control system 10 (see FIG. 4) initially acquires the speed of the motorcycle 100 from the vehicle speed sensor 11 (step S1). Next, the steering angle calculation unit 15a determines the proportionality constant and time constant based on the speed of the motorcycle 100 acquired in step S1 (step S2). The proportionality constant and time constant change depending on the vehicle speed. The relationships between the proportionality constant and the vehicle speed are stored in the steering angle calculation unit 15a.

The steering angle calculation unit 15a subsequently acquires the roll rate γ from the roll rate sensor 14 (step S3). Then, the steering angle calculation unit 15a calculates the target steeering angle δ1 and the delayed steering angle δ2 by the formulas (1) and (2) mentioned below (step S4).

$$\delta 1 = K \cdot \gamma \quad (1)$$

$$\delta 2 = \delta 1/(Ts+1) \quad (2)$$

In the above formula (1), K is the proportionality constant determined in step S2. In addition, in the above formula (2), T is the time constant determined in step S2 and s is a Laplacean.

Next, the steering angle calculation unit 15a provides the steering angle control unit 15b with the delayed steering angle δ2 of the rear wheel 4 determined by the above formula (2) and the steering angle control unit 15b controls the actuator 16 based on the provided delayed steering angle δ2 to steer the rear wheel 4 step S5). That is, in this preferred embodiment, the target steering angle δ1 (=K·γ) of the rear wheel 4 is determined according to the proportionality constant K, and the rear wheel 4 is steered so that the rear wheel 4 is tilted at the delayed steering angle δ2 with the first-order delay filter of the time constant T.

Then, the steering angle control unit 15b acquires the rear wheel steering angle θ1 from the rear wheel steering angle sensor 17 (step S6). The steering angle control unit 15b subsequently determines whether or not the rear wheel steering angle θ1 acquired in step S6 reaches the delayed steering angle δ2 (step S7). When the rear wheel steering angle θ1 reaches the delayed steering angle δ2, the steering angle calculation unit 15a returns to step S1.

When the rear wheel steering angle θ1 does not reach the delayed steering angle δ2 in step S7, the steering angle control unit 15b repeats step S5 to step S7 until the rear wheel steering angle θ1 reaches the delayed steering angle δ2.

Figure 6:
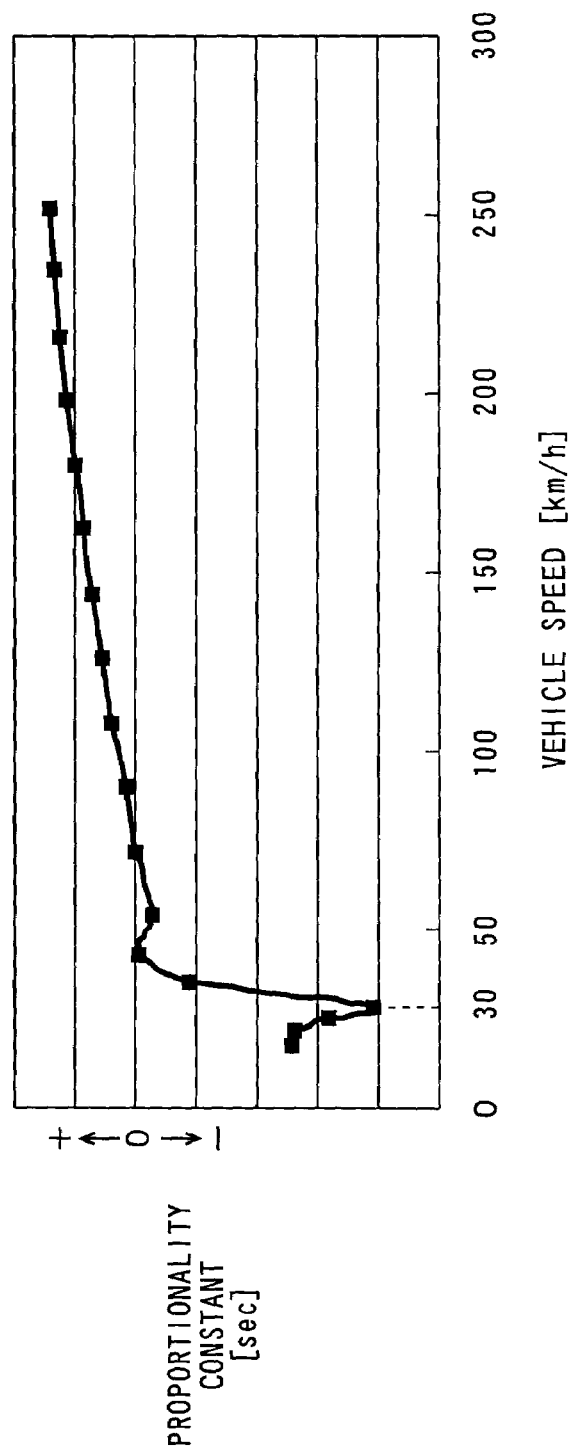
FIG. 6 is a diagram showing one example of a proportionality constant.
Figure 7:
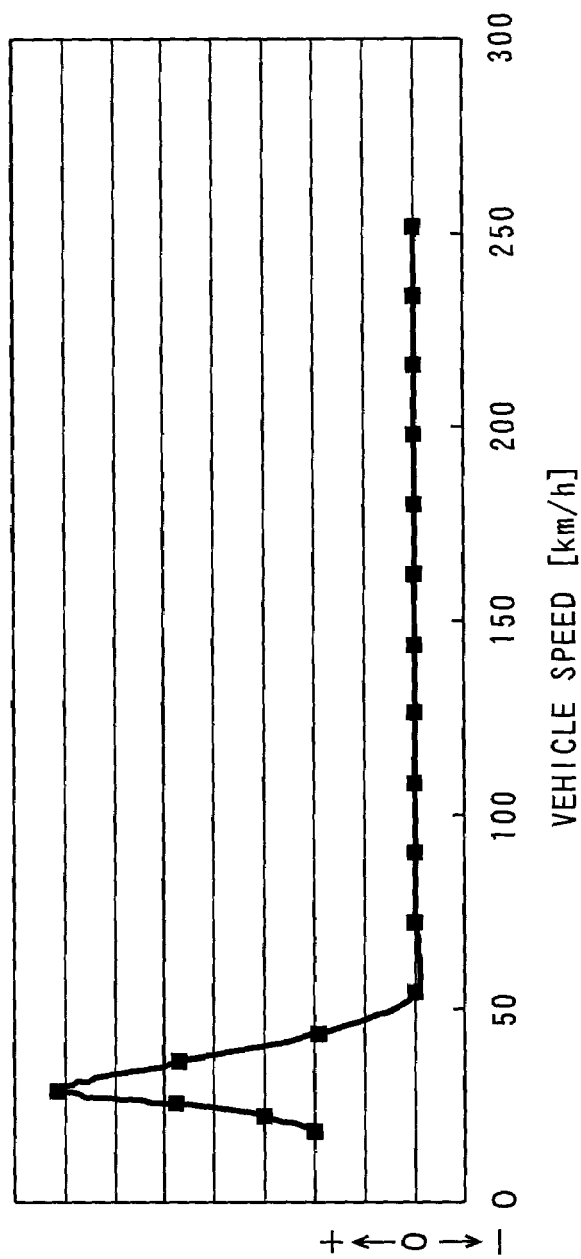
FIG. 7 is a diagram showing one example of a time constant.

The proportionality constant K and the time constant T determined in step S2 are, for example, the values indicated in FIGS. 6 and 7. In FIG. 6, the ordinate axis indicates the proportionality constant K and the abscissa axis indicates the vehicle speed. In FIG. 7, the ordinate axis indicates the time constant T and the abscissa axis indicates the vehicle speed. The time constant T and the proportionality constant K are appropriately determined depending on the vehicle speed by a variety of experiments, analysis and the like taking into consideration the structure of the motorcycle 100 or the like so that the above-mentioned instability phenomenon can be prevented.

If the roll rate in the direction indicated by the arrow P1 in FIG. 3 is regarded as a positive value, for example, the target steering angle δ1 has a positive value when the rear wheel 4 is tilted in the same direction as the arrow P1 in reference to the Z direction and the target steering angle δ1 has a negative value when the rear wheel 4 is tilted in the direction opposite to the arrow P1. For example, if the roll rate γ detected at a vehicle speed of 30 km/h has a positive value, since the proportionality constant K is a negative value at a vehicle speed of 30 km/h in the example of FIG. 6, the target steering angle δ1 has a negative value. Accordingly, the rear wheel 4 is controlled so as to be tilted in the direction opposite to the arrow P1. In contrast, if the roll rate γ detected at a vehicle speed of 30 km/h has a negative value, the target steering angle δ1 has a positive value, and thus the rear wheel 4 is controlled so as to be tilted in the same direction as the arrow P1.

Furthermore, in the example of FIG. 7, the value of the time constant T increases in a low and middle speed region. When the motorcycle 100 runs at low or middle speed in this example, the rear wheel 4 is steered during a certain period of time. In addition, when the motorcycle 100 runs at high speed, the rear wheel 4 is steered in a short time. In such a way, the time constant T is determined depending on the vehicle speed, which enables in a constantly stable running.

As described above, in this preferred embodiment, the roll rate γ and vehicle speed of the motorcycle 100 are detected and the steering angle of the rear wheel 4 is controlled based on the proportionality constant K determined depending on the detected roll rate γ and vehicle speed. Thus, the ratio of the lateral force of the front wheel 1 to that of the rear wheel 4 is adjusted to reduce the roll rate of the motorcycle 100. As a result, the running stability can be improved and the turning performance can be prevented from being degraded.

Furthermore, the time constant T is determined taking into consideration the frequency of the instability phenomenon unique to the motorcycle and the damping factor thereof, and the steering angle of the rear wheel 4 is controlled with the first-order delay filter of the time constant T. That is to say, the rear wheel 4 is steered at the response speed depending on the speed of the motorcycle 100. Thus, the running stability can be reliably improved and the turning performance can be reliably prevented from being degraded.

Moreover, the target steering angle δ1 and the delayed steering angle δ2 can be determined based on only the vehicle speed and the roll rate γ, thereby making it easier to control the rear wheel 4.

Second Preferred Embodiment

A motorcycle according to a second preferred embodiment differs from the motorcycle 100 according to the first preferred embodiment as described below. Since an external side view of the motorcycle according to the second preferred embodiment is the same as that of the motorcycle 100 according to the first preferred embodiment, the motorcycle according to this preferred embodiment will be described with reference to FIG. 1.

Figure 8:
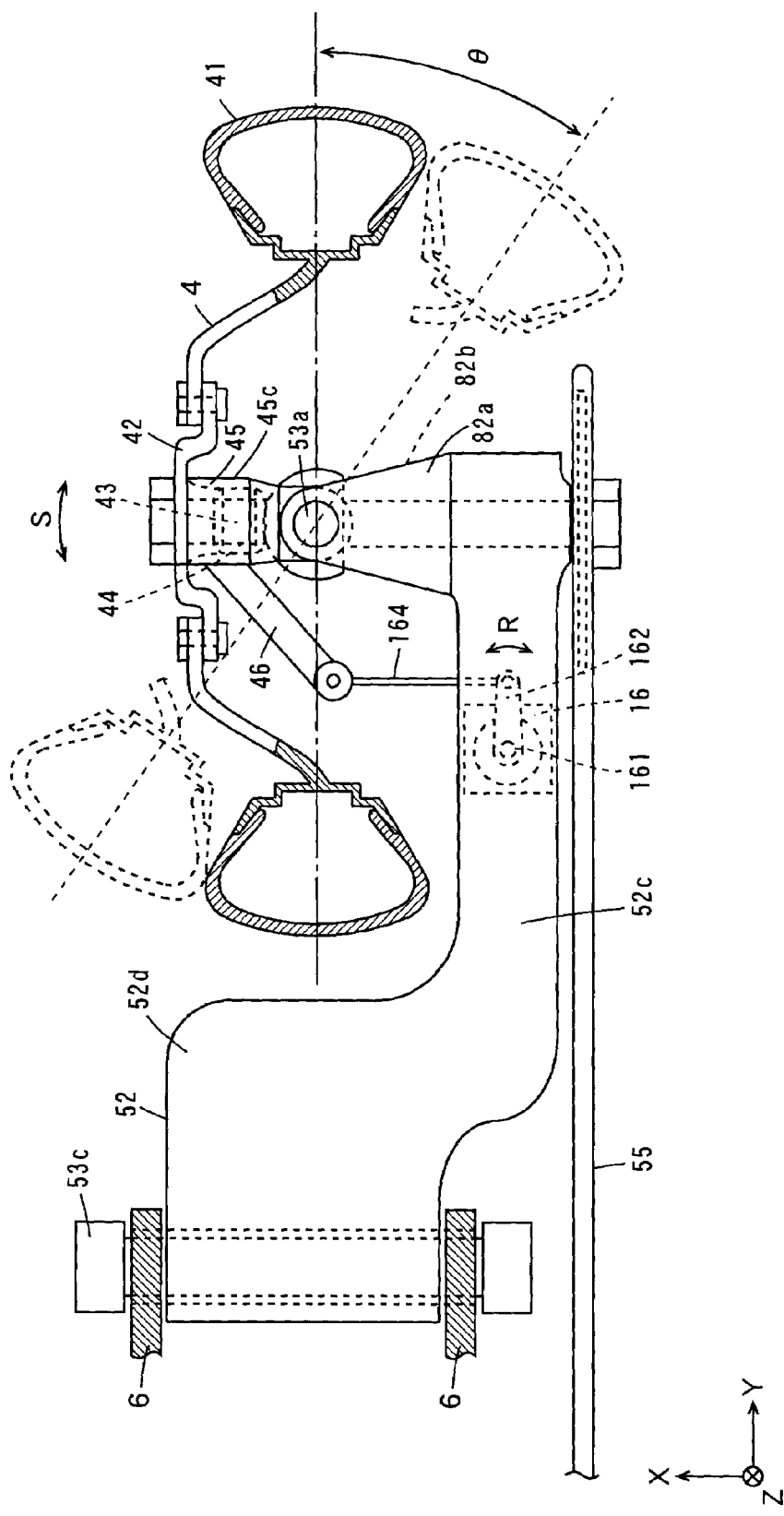
FIG. 8 is a sectional view taken along the arrowed line B-B in FIG. 1 according to a second preferred embodiment of the present invention.

FIG. 8 is a sectional view taken along the arrowed line B-B in FIG. 1. As shown in FIG. 8, in the second preferred embodiment, one end of a rear arm 52 that extends in the Y direction is connected to a main body frame 6 with a rotary connection shaft 53c. This enables the rear arm 52 to swing up and down.

The rear arm 52 has a wide portion 52d in the X direction near a portion connected to the main body frame 6. A narrow portion 52c narrower than the wide portion 52d is arranged so as to extend in the Y direction from one side of the wide portion 52d in the X direction.

Supporters 82a, 82b having the same structures as those of the supporters 52a, 52b in FIG. 2 are provided in the X-Z plane at the end of the narrow portion 52c.

An axle shaft supporting member 45 and a constant velocity universal joint 51j (not shown in FIG. 8) are attached between the supporters 82a and 82b in the same configuration as that in FIG. 2. In addition, a rear wheel rotary shaft 43, a rear wheel hub 42, and a rear wheel 4 are attached to the axle shaft supporting member 45 in the same configuration as that in FIG. 2.

An actuator 16 is provided in the narrow portion 52c of the rear arm 52. In addition, a knuckle arm 46 is integral with and disposed on one side of a cylindrical portion 45c of the axle shaft supporting member 45, which extends so as to be inclined with respect to the Y direction.

One end of a swing arm 162 is coupled to a rotary shaft 161 of the actuator 16. One end of a tie-rod 164 is swingably coupled to the other end of the swing arm 162.

The actuator 16 operates to rotate the rotary shaft 161. This causes the other end of the swing arm 162 to swing about the rotary shaft 161 in the directions indicated by the arrow R. Thus, the portion of the knuckle arm 46 connected to the tie-rod 164 is moved in the X direction by the tie-rod 164. As a result, the axle shaft supporting member 45 swings about rotary connection shafts 53a, 53b as indicated by the arrow S.

In such a way, the operation of the actuator 16 makes the rear wheel 4 tilt with respect to the Y direction in the X-Y plane. In this preferred embodiment, the lean angle of the rear wheel 4 with respect to the Y direction is referred to as a rear wheel steering angle θ1. Note that the rear wheel 4 is fixed so as not to swing respect to the Z direction.

The rear wheel steering angle θ1 is controlled similarly to the control method described in FIG. 5 using the above-mentioned formulas (1) and (2) with the configuration as described above. The proportionality constant K and the time constant T are appropriately determined depending on the vehicle speed by a variety of experiments, analysis and the like taking into consideration the structure of the motorcycle or the like, as mentioned above.

As described above, also in this preferred embodiment, the roll rate γ and vehicle speed of the motorcycle are detected and the steering angle of the rear wheel 4 is controlled based on the proportionality constant K determined depending on the detected roll rate γ and vehicle speed. Thus, the ratio of the lateral force of a front wheel 1 to that of the rear wheel 4 is adjusted to reduce the roll rate of the motorcycle. As a result, the running stability can be improved and the turning performance can be prevented from being degraded.

Furthermore, the time constant T is determined taking into consideration the frequency of the instability phenomenon unique to the motorcycle and the damping factor thereof and the steering angle of the rear wheel 4 is controlled with the first-order delay filter of the time constant T. That is to say, the rear wheel 4 is steered at the response speed according to the speed of the motorcycle. Thus, the running stability can be reliably improved and the turning performance can be reliably prevented from being degraded.

Third Preferred Embodiment

A motorcycle according to a third preferred embodiment differs from the motorcycles according to the first and second preferred embodiments as described below.

Figure 9:
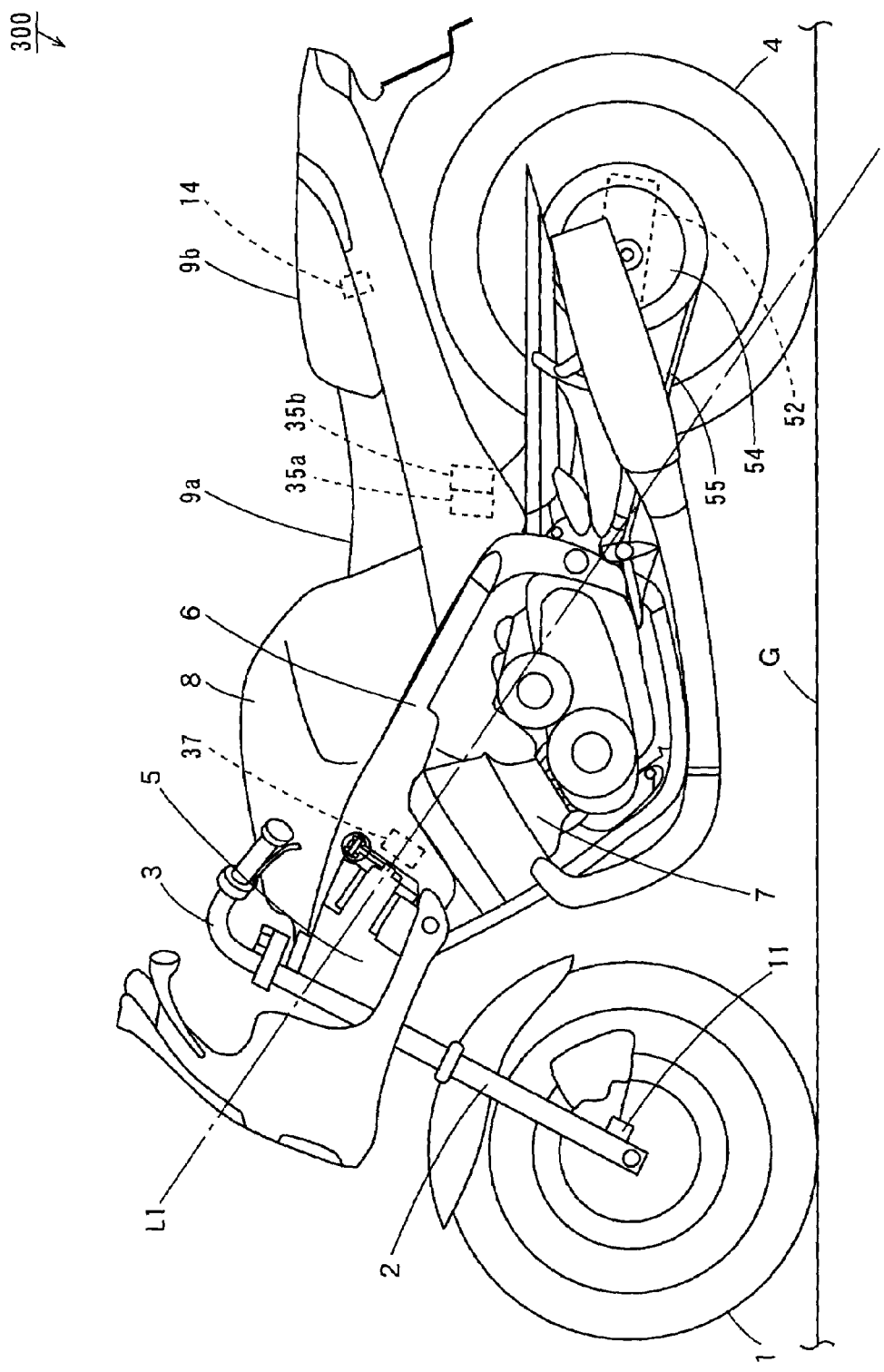
FIG. 9 is an external side view of a motorcycle according to a third preferred embodiment of the present invention.

FIG. 9 is an external side view of the motorcycle according to the third preferred embodiment of the present invention. In the third preferred embodiment, a rear wheel 4 is not steered and is fixed so as not to swing.

As shown in FIG. 9, in a motorcycle 300 according to the third preferred embodiment, a lean angle calculation unit 35a and a lean angle control unit 35b are provided below a front seat 9a, and a lean angle sensor 37 is provided on a main body frame 6.

Furthermore, a head pipe 5 is rotatably coupled to the main body frame 6. Hereinafter, the structure of the coupling portion of the head pipe 5 and the main body frame 6 is described.

Figure 10:
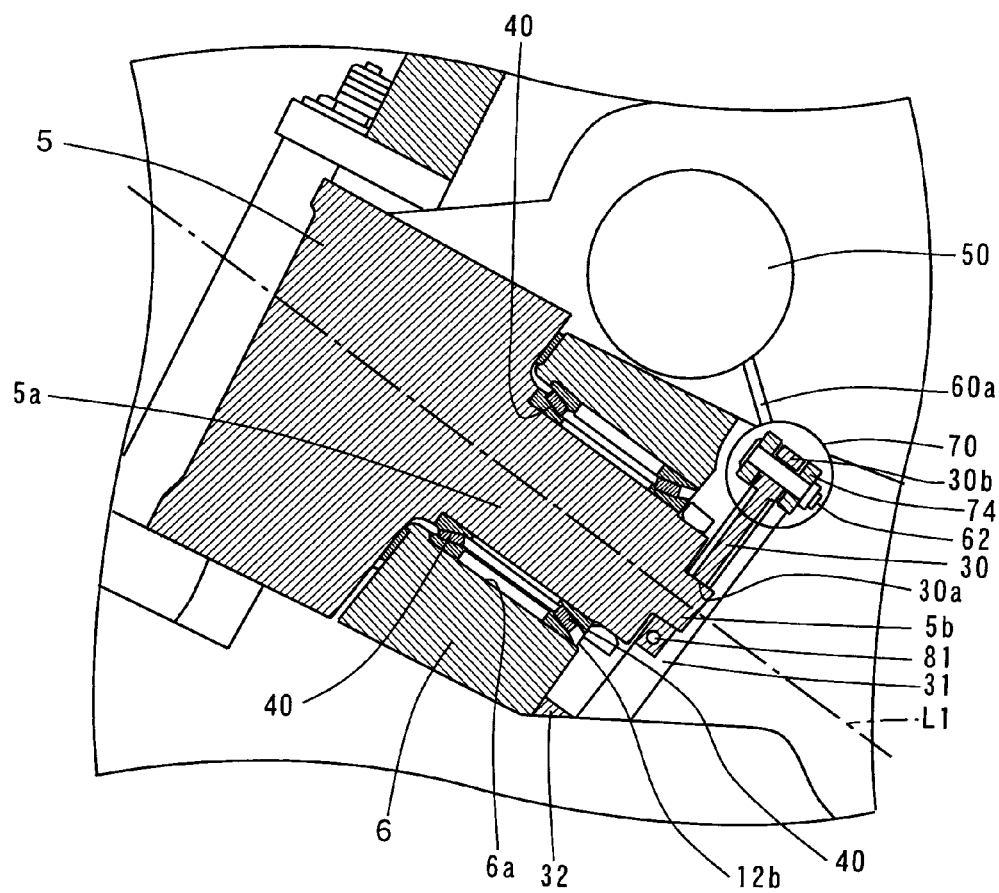
FIG. 10 is a schematic side sectional view of a coupling portion of a head pipe and a main body frame.
Figure 11:
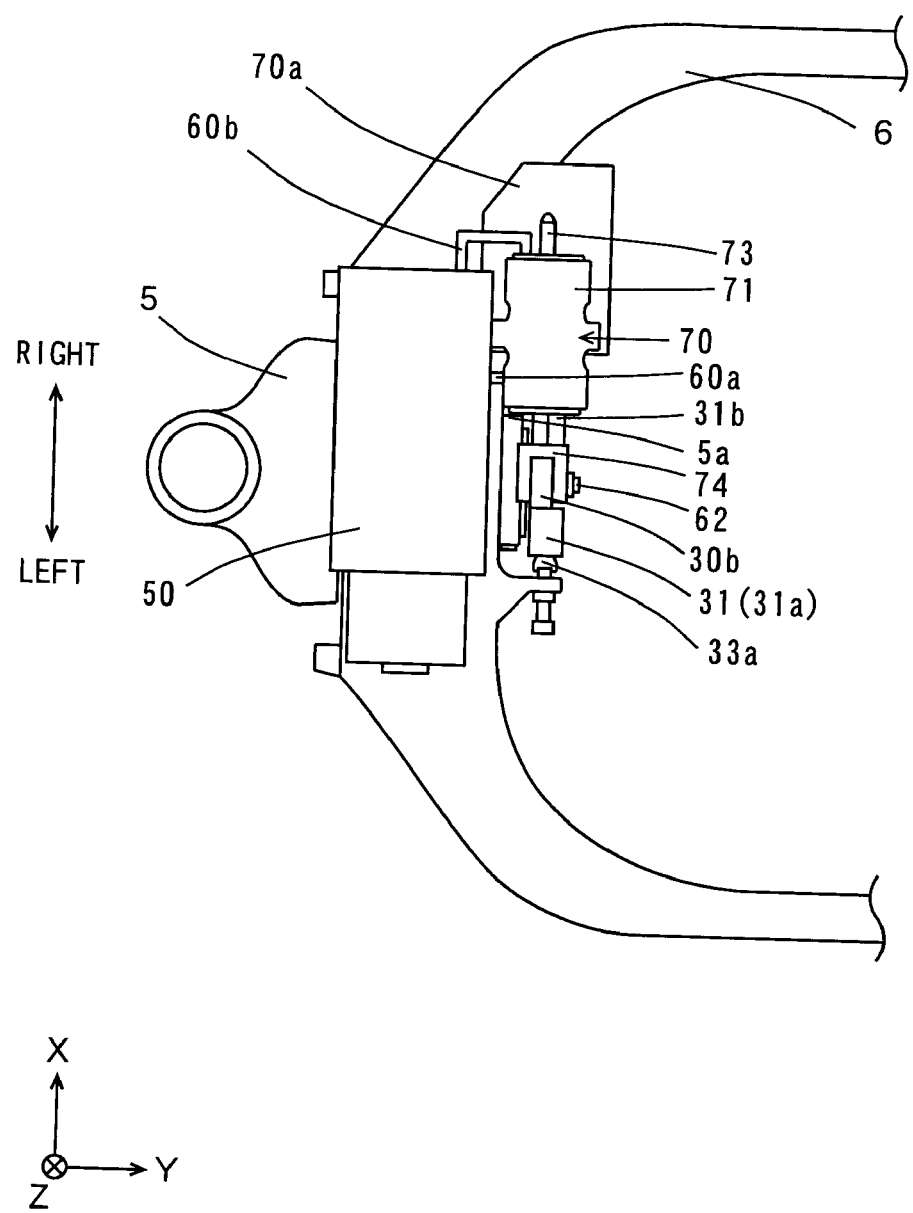
FIG. 11 is a schematic top view of the coupling portion of the head pipe and the main body frame.
Figure 12:
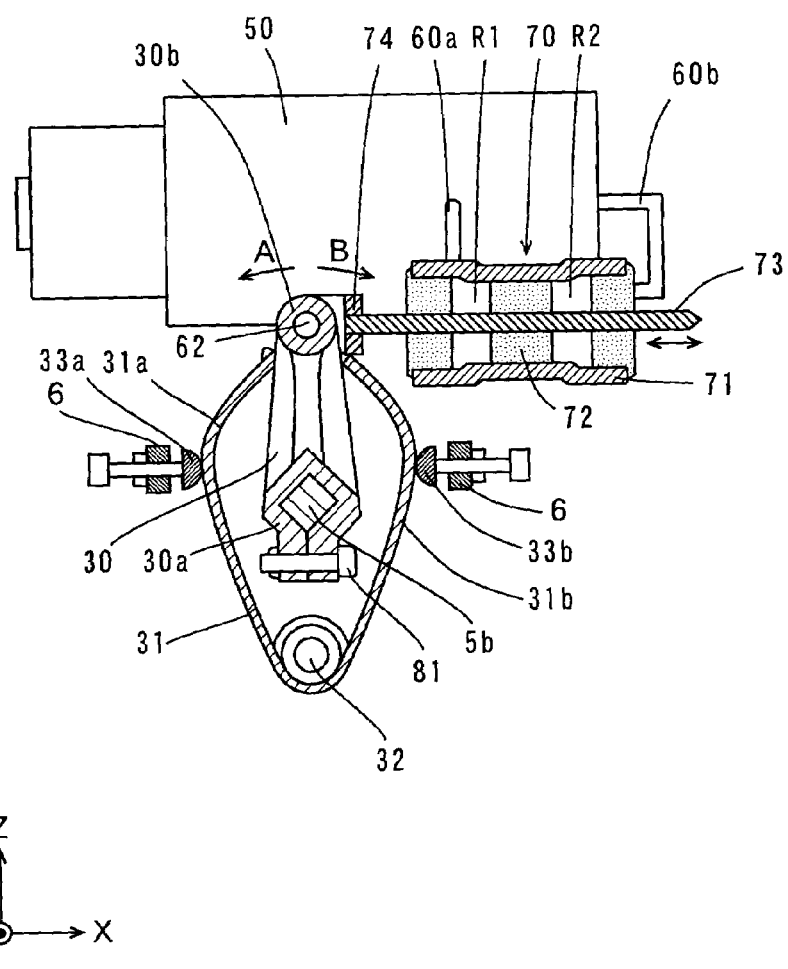
FIG. 12 is a schematic rear view of the coupling portion of the head pipe and the main body frame.

FIG. 10 is a schematic side sectional view of the coupling portion of the heap pipe 5 and the main body frame 6, FIG. 11 is a schematic top view of the coupling portion of the head pipe 5 and the main body frame 6, and FIG. 12 is a schematic rear view of the coupling portion of the head pipe 5 and the main body frame 6. In FIGS. 10 to 12, the side-to-side direction of the motorcycle is defined as the X direction, the back-and-forth direction of the motorcycle is defined as the Y direction, and the vertical direction of the motorcycle is defined as the Z direction similarly to FIG. 2.

As shown in FIG. 10, a cylindrical shaft 5a is formed in the rear portion of the head pipe 5. A shaft insertion hole 6a is formed in the center of the front portion of the main body frame 6. The shaft 5a is inserted into this shaft insertion hole 6a.

A tapered roller bearing 40 is provided between the inner surface of the shaft insertion hole 6a and the shaft 5a. This enables the head pipe 5 to rotate about an axial center L1 extending in the back-and-forth direction of the shaft 5a of the head pipe 5 with respect to the main body frame 6. The tapered roller bearing 40 is arranged so that its central axis is substantially identical to the axial center L1. In addition, as shown in FIG. 9, an extension line of the axial center L1 extends rearward and obliquely downward and passes through the rear wheel 4 and the vicinity of the contact point between the rear wheel 4 and the ground G.

A projection 5b having a substantially rectangular cross section (see FIG. 12) is provided on the rear end of the shaft 5a of the head pipe 5. A rotation member 30 having the function of transmitting the driving force is fixed to this projection 5b by a bolt 81. As shown in FIG. 12, an engagement portion 30a having an engagement hole with a substantially rectangular cross section is formed in one end of the rotation member 30, which engages the projection 5b of the shaft 5a. An engagement portion 30b having an engagement hole with a substantially circular cross section is formed in the other end of the rotation member 30.

As shown in FIGS. 10 and 12, a leaf spring 31 is attached to the main body frame 6 by use of a supporting member 32 such that the rotation member 30 is pinched by the leaf spring 31 from opposite sides of the rotation member 30. The leaf spring 31 has a spring portion 31a abutting against the left side of the rotation member 30 and a spring portion 31b abutting against the right side of the rotation member 30.

A pair of position limiting members 33a, 33b are attached to the main body frame 6 so as to be opposite to each other, which abut against the spring portions 31a, 31b of the leaf spring 31 and limit the rotation angle in the arrow A direction and the arrow B direction of the rotation member 30. These position limiting members 33a, 33b are arranged such that the rotation member 30 is held in the neutral position in the rotation directions (directions indicated by the arrows A, B). Specifically, if the rotation member 30 rotates in the arrow A direction or in the arrow B direction and is not in the neutral position, a drag for returning the rotation member 30 to the neutral position is produced by the spring portions 31a or 31b.

As shown in FIGS. 10 and 11, a hydraulic cylinder (actuator) 70 for rotating the head pipe 5 with respect to the main body frame 6 is attached to the upper portion of the main body frame 6 with a cylinder bracket 70a (see FIG. 11). As shown in FIGS. 11 and 12, the hydraulic cylinder 70 includes a tube 71, a piston 72 (FIG. 12) provided in the tube 71, a piston rod 73 fixed to the piston 72, and a coupling member 74 attached to one end of the piston rod 73.

The tube 71 is fixed to the cylinder bracket 70a. In addition, as shown in FIG. 12, the inner portion of the tube 71 is divided into two regions R1, R2 by the piston 72 which are filled with oil.

A pump 50 is provided above the hydraulic cylinder 70. The regions R1, R2 of the hydraulic cylinder 70 communicate with the pump 50 through hydraulic pipes 60a, 60b. Oil is supplied to the hydraulic cylinder 70 by the pump 50 through the hydraulic pipes 60a, 60b. The piston rod 73 is provided so as to pass through the tube 71.

As shown in FIG. 11, the coupling member 74 is coupled to the engagement portion 30b of the rotation member 30, preferably by a bolt 62. In this preferred embodiment, the tube 71 is connected to the main body frame 6, and the piston 72 and the piston rod 73 are connected to the head pipe 5 with the rotation member 30.

With such a configuration, the linear motion of the piston 72 in the hydraulic cylinder 70 is converted to the rotary motion of the rotation member 30 and then transmitted to the shaft 5a of the head pipe 5 to rotate the head pipe 5 about the axial center L1 (see FIG. 10) with respect to the main body frame 6. Accordingly, it is possible to rotate the head pipe 5 by controlling the amount of oil supplied to the cylinder 70.

Next, a control system of the motorcycle 300 according to this preferred embodiment and its control method are described.

Figure 13:
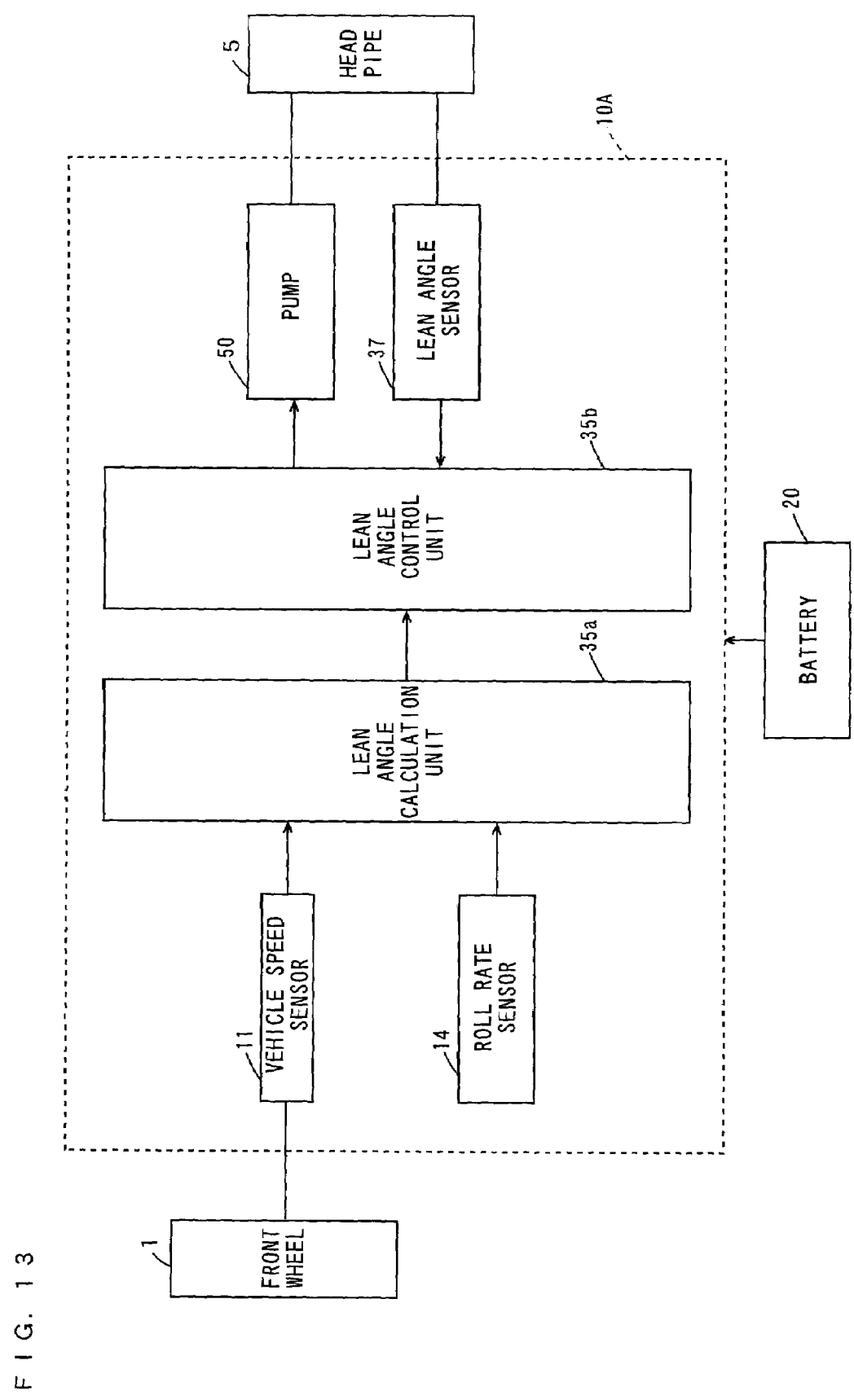
FIG. 13 is a block diagram showing one example of a control system of the motorcycle according to the third preferred embodiment of the present invention.

FIG. 13 is a block diagram showing one example of a control system 10A of the motorcycle 300 according to this preferred embodiment of the present invention.

As shown in FIG. 13, the control system 10A of the motorcycle 300 includes a vehicle speed sensor 11, a roll rate sensor 14, the lean angle calculation unit 35a, the lean angle control unit 35b, the lean angle sensor 37, and the pump 50. In addition, electric power is supplied to the control system 10A from a battery 20.

The lean angle sensor 37 detects a lean angle θ2 of the head pipe 5 relative to the main body frame 6 to the right and left by detecting the lean angle from the neutral position of the rotation member 30.

The lean angle calculation unit 35a and the lean angle control unit 35b preferably include, for example, a CPU (Central Processing Unit) and a storage device or a microcomputer. The detected values of the vehicle speed sensor 11 and the roll rate sensor 14 are input to the lean angle calculation unit 35a. The lean angle calculation unit 35a calculates the target lean angle of the head pipe 5 based on the input detected values. The lean angle control unit 35b controls the operation of the pump 50 based on the target lean angle calculated by the lean angle calculation unit 35a.

The lean angle control unit 35b controls the operation of the pump 50 (hydraulic cylinder 70) to adjust the lean angle θ2 of the head pipe 5. The adjusted lean angle θ2 is detected by the lean angle sensor 37 and the detected lean angle θ2 is input to the lean angle control unit 35b. In this way, feedback control is performed on the pump 50 (hydraulic cylinder 70) based on the lean angle θ2.

Figure 14:
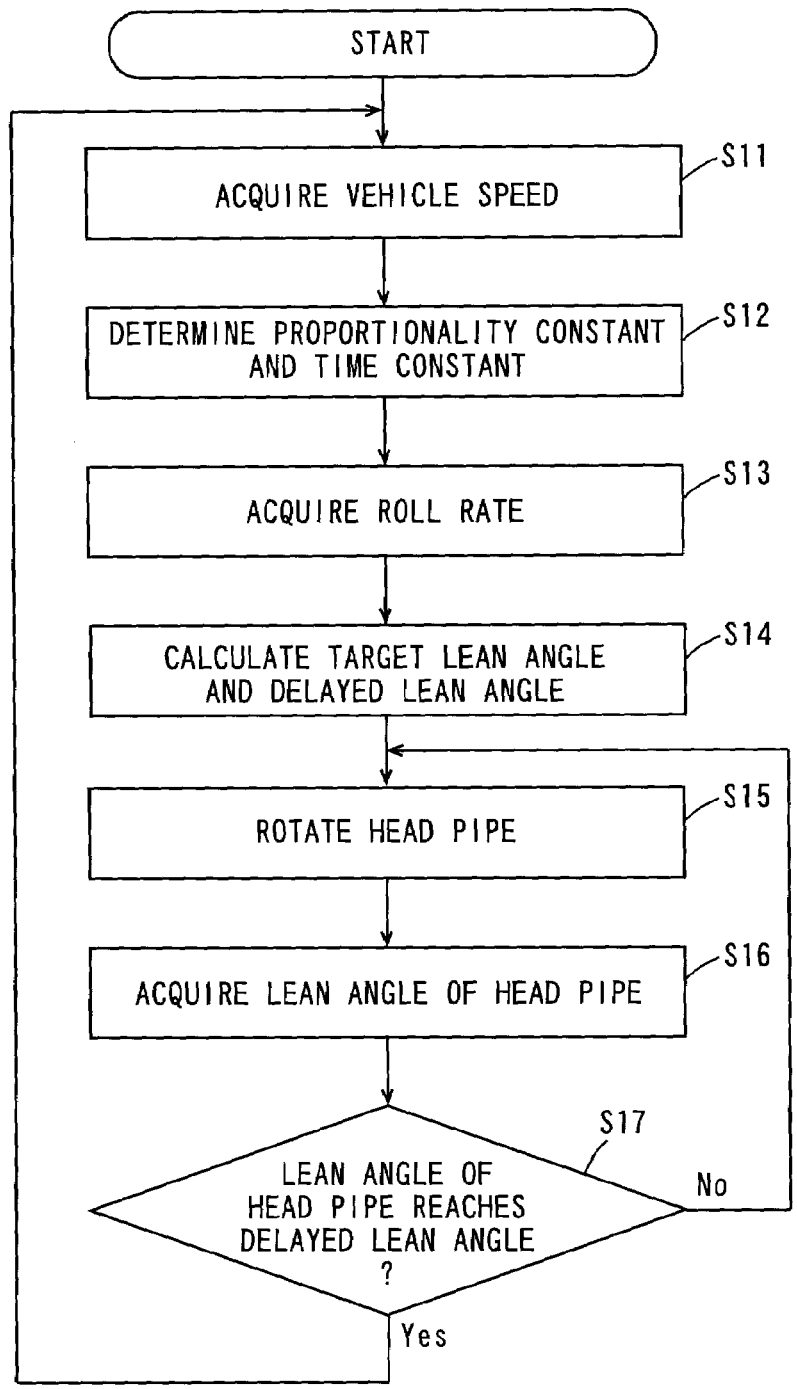
FIG. 14 is a flowchart showing one example of a control method by the control system of the motorcycle according to the third preferred embodiment of the present invention.

FIG. 14 is a flowchart showing one example of the control method by the control system 10A of the motorcycle 300 according to this preferred embodiment of the present invention.

As shown in FIG. 14, the lean angle calculation unit 35a of the control system 10A (see FIG. 13) initially acquires the speed of the motorcycle 300 from the vehicle speed sensor 11 (step S11). Next, the lean angle calculation unit 35a determines the proportionality constant and time constant based on the speed of the motorcycle 300 acquired in step S11 (step S12).

The lean angle calculation unit 35a subsequently acquires the roll rate γ from the roll rate sensor 14 (step S13). Then, the lean angle calculation unit 35a calculates the target lean angle δ1 and the delayed lean angle δ2 of the head pipe 5 by the formulas (1) and (2) mentioned above (step S14).

Next, the lean angle calculation unit 35a provides the lean angle control unit 35b with the delayed lean angle δ2 of the head pipe 5 determined by the above formula (2) and the lean angle control unit 35b controls the pump 50 (hydraulic cylinder 70) based on the provided delayed lean angle δ2 to rotate the head pipe 5 (step S15).

The lean angle control unit 35b subsequently acquires the lean angle θ2 of the head pipe 5 from the lean angle sensor 37 (step S16). Then, the lean angle control unit 35b determines whether or not the lean angle θ2 acquired in step S16 reaches the delayed lean angle δ2 (step S17) When the lean angle θ2 reaches the delayed lean angle δ2, the lean angle calculation unit 35a returns to step S11.

When the lean angle θ2 does not reach the delayed lean angle δ2 in step S17, the lean angle control unit 35b repeats step S15 to step S17 until the lean angle θ2 reaches the delayed lean angle δ2.

The proportionality constant K and the time constant T are appropriately determined depending on the vehicle speed by a variety of experiments, analysis and the like taking into consideration the structure of the motorcycle 300 or the like, as described in the first and second preferred embodiments.

That is, the proportionality constants K and the time constants T are preferably different in the first, second, and third preferred embodiments, respectively.

As described above, in this preferred embodiment, the roll rate γ and vehicle speed of the motorcycle 300 are detected and the lean angle θ2 of the head pipe 5 is controlled based on the proportionality constant K determined according to the detected roll rate γ and vehicle speed. Thus, the ratio of the lateral force of the front wheel 1 to that of the rear wheel 4 is adjusted to reduce the roll rate of the motorcycle 300. As a result, the running stability can be improved and the turning performance can be prevented from being degraded.

Furthermore, the time constant T is determined taking into consideration the frequency of the instability phenomenon unique to the motorcycle and the damping factor thereof and the lean angle of the head pipe 5 is controlled with the first-order delay filter of the time constant T. That is to say, the head pipe 5 is tilted at the response speed depending on the speed of the motorcycle 300. Thus, the running stability can be reliably improved and the turning performance can be reliably prevented from being degraded.

In addition, the head pipe 5 and the main body frame 6 are attached such that an extension line of the axial center L1 passes substantially through the contact point between the rear wheel 4 and the ground G. For this reason, when the main body frame 6 is rotated with respect to the head pipe 5, the rear wheel 4 rotates about the vicinity of the contact point between the rear wheel 4 and the ground G. Accordingly, the rear wheel 4 can be prevented from slipping on the ground G and safety can be improved.

Moreover, the target lean angle δ1 and the delayed lean angle δ2 can be determined based on only the vehicle speed and the roll rate γ, thereby making it easy to control the rear wheel 4.

Other Preferred Embodiments

Although the rear wheel steering angle θ1 or the lean angle θ2 is preferably controlled with the first-order delay filter in the above-described first to third preferred embodiments, the rear wheel steering angle θ1 or the lean angle θ2 may be controlled with a first-order active filter, a washout filter, or the like.

Furthermore, although the lean angle of the head pipe 5 with respect to the main body frame 6 is preferably controlled by rotating the head pipe 5 in the third preferred embodiment, the lean angle of the main body frame 6 with respect to the head pipe 5 may be controlled by rotating the main body frame 6.

In the following paragraphs, non-limiting examples of correspondences between various elements recited in the claims below and those described above with respect to various preferred embodiments of the present invention are explained.

In the first and second preferred embodiments described above, the head pipe 5 and the main body frame 6 are an example of a holding member; the rear arm 52, the bearing 44, the axle shaft supporting member 45, the knuckle arm 46 and the tie-rod 164 are an example of a rear wheel supporting mechanism; the roll rate sensor 14 is an example of a roll rate detector; the actuator 16 is an example of a swinging device; the steering angle calculation unit 15a and the steering angle control unit 15b are an example of a controller; the vehicle speed sensor 11 is an example of a speed detector; and the proportionality constant K is an example of a factor.

Further, in the third preferred embodiment, the head pipe 5 is an example of a first holding member; the main body frame 6 is an example of a second holding member; the roll rate sensor 14 is an example of a roll rate detector; the rotation member 30, the leaf spring 31, the pump 50, and the hydraulic cylinder 70 are an example of a swinging device; the lean angle calculation unit 35a and the lean angle control unit 35b are an example of a controller; the axial center L1 is an example of an axis that extends in the back-and-forth directions; the vehicle speed sensor 11 is an example of a speed detector; and the proportionality constant K is an example of a factor.

Moreover, in the above-described first to third preferred embodiments, the engine 7 is an example of a driving device and the chain sprocket 54 and the chain 55 are an example of a driving force transmission mechanism.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A control system that controls the balance of a motorcycle comprising:
    a first holding member arranged to rotatably and steerably hold a steering handle and front fork connected to a front wheel of the motorcycle;
    a second holding member that is swingably attached to the first holding member, the second holding member connected to a rear arm arranged to hold a rear wheel;
    a roll rate detector arranged to detect a roll rate of the motorcycle;
    a swinging device arranged to swing one of the first and second holding members with respect to the other; and
    a controller arranged to cause the swinging device to swing one of the first and second holding members with respect to the other based on the roll rate detected by the roll rate detector; wherein
    the first and second holding members are attached to each other rotatably about an axis that extends in a diagonal direction between an upper front portion and a lower rear portion of the motorcycle.

2. The control system according to claim 1, wherein
    an extension line of the axis that extends between the upper front portion and the lower rear portion of the motorcycle passes substantially through a contact point between the rear wheel and the ground, and
    the controller relatively rotates one of the first and second holding members with respect to the other based on the roll rate detected by the roll rate detector.

3. The control system according to claim 2, further comprising a speed detector that detects a vehicle speed of the motorcycle, wherein
    the controller determines a relative rotation angle of the second holding member with respect to the first holding member based on a product of the roll rate detected by the roll rate detector and a factor, and the factor is determined based on the vehicle speed detected by the speed detector.

4. The control system according to claim 3, wherein
    the controller relatively rotates one of the first and second holding members with respect to the other at a response speed determined based on the vehicle speed detected by the speed detector.

5. The control system according to claim 3, wherein
    the controller relatively rotates one of the first and second holding members with respect to the other with a first-order delay filter, and
    a time constant of the first-order delay filter is determined based on the vehicle speed detected by the speed detector.

6. The control system according to claim 1, wherein an extension line of the axis that extends between the upper front portion and the lower rear portion of the motorcycle passes through the steering handle and the rear wheel of the motorcycle.

7. A motorcycle comprising:
    a control system arranged to control the balance of a motorcycle;
    a driving device arranged to generate a driving force to rotate a rear wheel of the motorcycle; and
    a driving force transmission mechanism arranged to transmit the driving force generated by the driving device to the rear wheel; wherein
    the control system includes:
        a first holding member arranged to rotatably and steerably hold a steering handle and front fork connected to a front wheel of the motorcycle;
        a second holding member that is attached to the first holding member, the second holding member connected to a rear arm arranged to hold the rear wheel;
        a roll rate detector arranged to detect a roll rate of the motorcycle;
        a swinging device arranged to swing one of the first and second holding members with respect to the other; and
        a controller arranged to cause the swinging device to swing one of the first and second holding members with respect to the other based on the roll rate detected by the roll rate detector; wherein
        the first and second holding members are attached to each other rotatably about an axis that extends in a diagonal direction between an upper front portion and a lower rear portion of the motorcycle.

8. The motorcycle according to claim 7, wherein an extension line of the axis that extends between the upper front portion and the lower rear portion of the motorcycle passes through the steering handle and the rear wheel of the motorcycle.

* * * * *

UNITED STATES PATENT AND TRADEMARK OFFICE
CERTIFICATE OF CORRECTION

PATENT NO. : 7,648,000 B2  
APPLICATION NO. : 11/555332  
DATED : January 19, 2010  
INVENTOR(S) : Tetsuya Kimura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 534 days.

Signed and Sealed this

Sixteenth Day of November, 2010

David J. Kappos  
*Director of the United States Patent and Trademark Office*